(12) United States Patent
Franzolin et al.

(10) Patent No.: US 6,766,796 B2
(45) Date of Patent: Jul. 27, 2004

(54) HEAT EXCHANGER FOR FORCED AIR CIRCULATION OVENS, PARTICULARLY FOR BAKING FOOD

(75) Inventors: Enrico Franzolin, Vigodarzere (IT); Antonio Bassan, Vigodarzere (IT)

(73) Assignee: Unox S.p.A., Vigodarzere (IT)

( * ) Notice: Subject to any disclaimer, the term of this patent is extended or adjusted under 35 U.S.C. 154(b) by 120 days.

(21) Appl. No.: 10/274,196

(22) Filed: Oct. 21, 2002

(65) Prior Publication Data

US 2003/0079736 A1 May 1, 2003

(30) Foreign Application Priority Data

Oct. 31, 2001 (IT) ..................................... PD2001A0259

(51) Int. Cl.[7] ............................................. F24C 15/32
(52) U.S. Cl. ..................... 126/21 A; 126/21 R; 126/80; 126/85 B
(58) Field of Search ............................ 126/21 A, 21 R, 126/80, 312, 307 R, 85 B; 99/331, 473, 474

(56) References Cited

U.S. PATENT DOCUMENTS 3,831,579 A   8/1974  Tamada et al.
5,619,983 A * 4/1997  Smith ....................... 126/21 A

FOREIGN PATENT DOCUMENTS

| DE | 94 16 205 | 12/1994 |
| EP | 0 576 385 | 12/1993 |
| EP | 0 599 103 | 6/1994 |

* cited by examiner

Primary Examiner—Jiping Lu
(74) Attorney, Agent, or Firm—Guido Modiano; Albert Josif; Daniel O'Byrne

(57) ABSTRACT

A heat exchanger for forced air circulation ovens, particularly for baking foods, of the type that comprise two chambers, a baking chamber and a heat exchange chamber, between which at least one fan circulates air. The exchanger comprises a burner and, in an upward region, coupling connectors that have an oval profile and are inserted in corresponding complementarily shaped straight vertical tubes that end in an upper manifold. The end portion of each one of the vertical tubes is surrounded by an interspace formed by a portion of tube that connects the heat exchange chamber to the manifold.

6 Claims, 3 Drawing Sheets

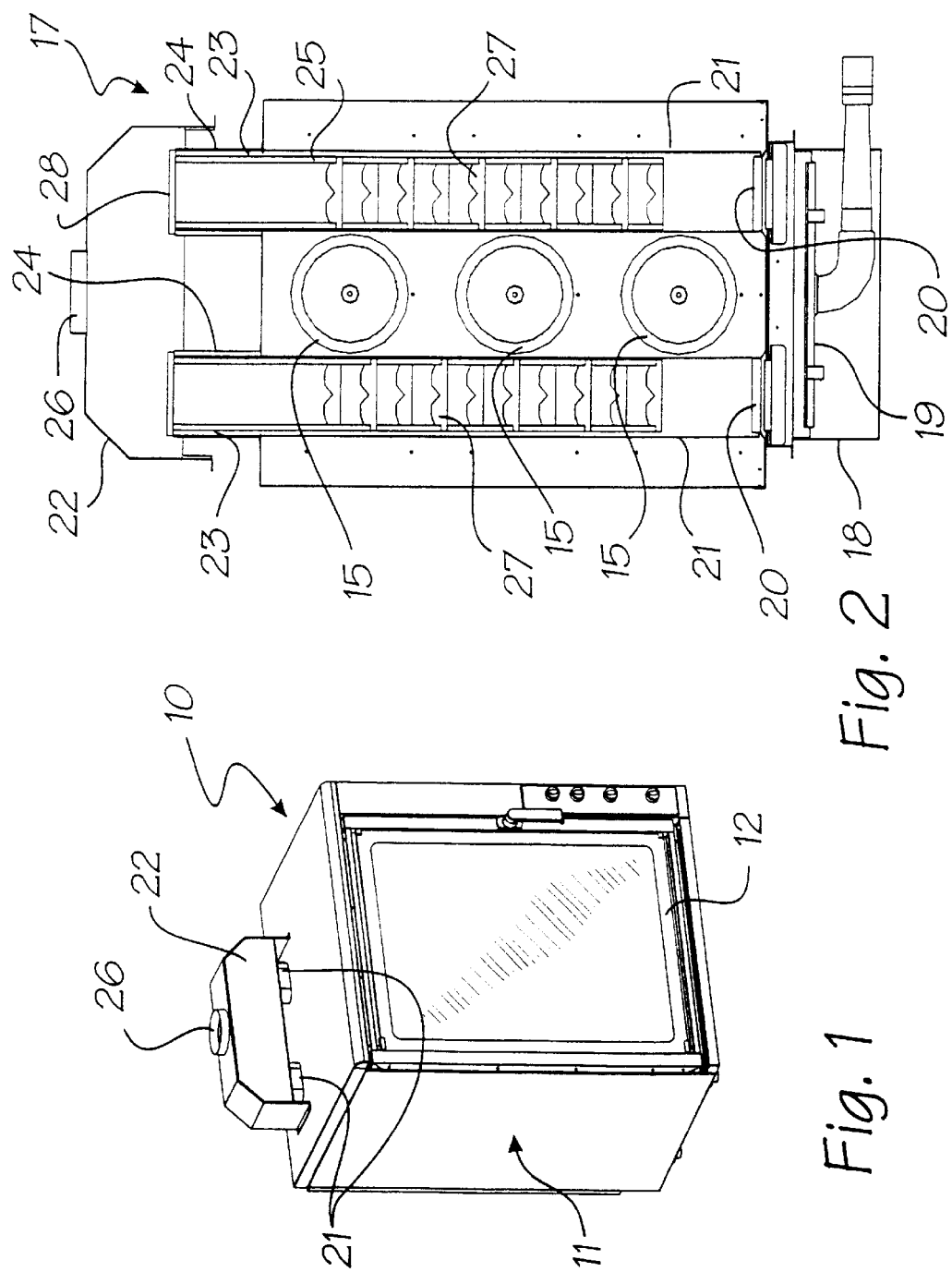

HEAT EXCHANGER FOR FORCED AIR CIRCULATION OVENS, PARTICULARLY FOR BAKING FOOD

BACKGROUND OF THE INVENTION

The present invention relates to a heat exchanger for forced air circulation ovens, particularly but not exclusively useful for baking food.

Many models of ovens with forced circulation of hot air are currently commercially available and have a substantially common basic structure.

Ovens with forced circulation of hot air in fact have substantially two chambers, a baking chamber and a heat exchange chamber, between which air is circulated by means of one or more fans.

Inside the heat exchange chamber, heat is transferred from a heating means (usually a burner or an electric resistor) to the air, while in the baking chamber heat is transferred from the air to the food.

Commercially available forced circulation ovens differ substantially in the manners in which they perform the heat exchange between the heating means or medium and the air and between the air and the food.

Ovens that use electric resistors, despite being widely used, have the considerable and inevitable drawback of using a form of energy (electric power) of high quality for a merely thermal application.

Among ovens that use gas burners, some perform the heat exchange inside the baking chamber by means of tube bundles arranged vertically or so as to surround the ventilation means.

The execution of the tube bundles and of the end manifolds provided together with them (a lower one which contains the burner, and an upper one, for collection and toward the flue) entails processes that are certainly not easy and welds that constitute weakening regions, taking into account the expected operating conditions.

The high temperatures in fact produce thermal stresses due to the considerable differences in temperature among the various regions, which lead to tensions in the material and to breakage in the weaker parts.

SUMMARY OF THE INVENTION

The aim of the present invention is to provide a heat exchanger for forced air circulation ovens that eliminates the drawback noted above.

Within this aim, an object of the present invention is to provide a heat exchanger whose structure is simple and can be manufactured by way of known technologies.

Another object of the present invention is to provide a heat exchanger that thanks to its constructive simplicity is less expensive than known ones.

This aim and these and other objects that will become better apparent hereinafter are achieved by a heat exchanger for forced air circulation ovens, particularly for baking foods, of the types that comprise two chambers, a baking chamber and a heat exchange chamber, between which at least one fan circulates the air, having a structure that is characterized in that it comprises a box-like body that contains burner means and is provided, in an upward region, with coupling connectors that have an oval profile and are inserted in corresponding complementarily shaped straight vertical tubes that end in an upper manifold, the end portion of each one of said tubes being surrounded by an interspace that is formed by a portion of tube that connects said heat exchange chamber to said manifold.

BRIEF DESCRIPTION OF THE DRAWINGS

Further characteristics and advantages of the present invention will become better apparent from the description of an embodiment thereof, illustrated by way of non-limitative example in the accompanying drawings, wherein:

FIG. 1 is a front perspective view of an oven provided with the exchanger according to the present invention;

FIG. 2 is a transverse sectional view of the oven of FIG. 1 in the region of the exchanger;

DESCRIPTION OF THE PREFERRED EMBODIMENTS

Figure 3:
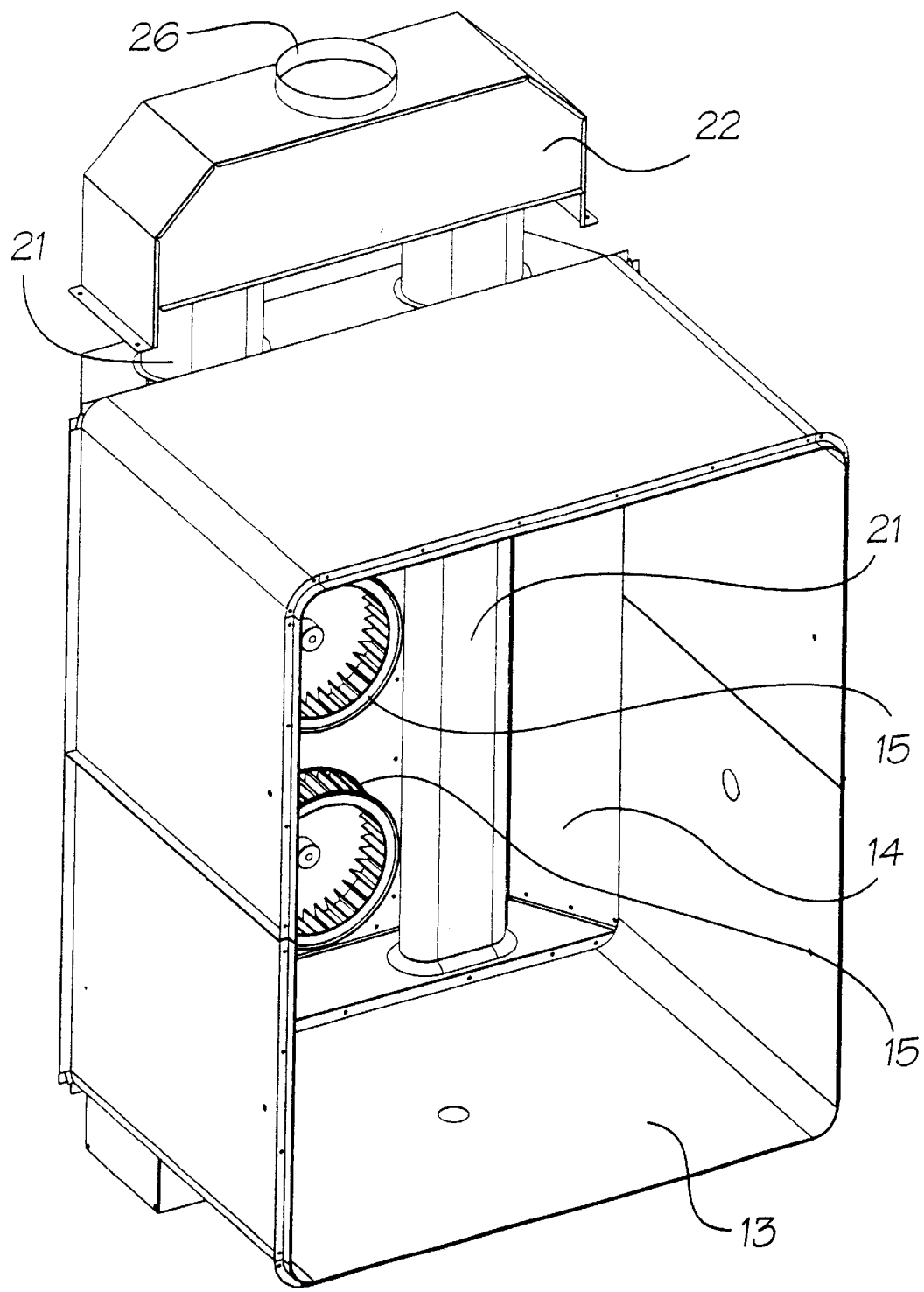
FIG. 3 is a front perspective view of the inner shell of the oven with the exchanger, without the partition between the baking chamber and the heat exchange chamber.
Figure 4:
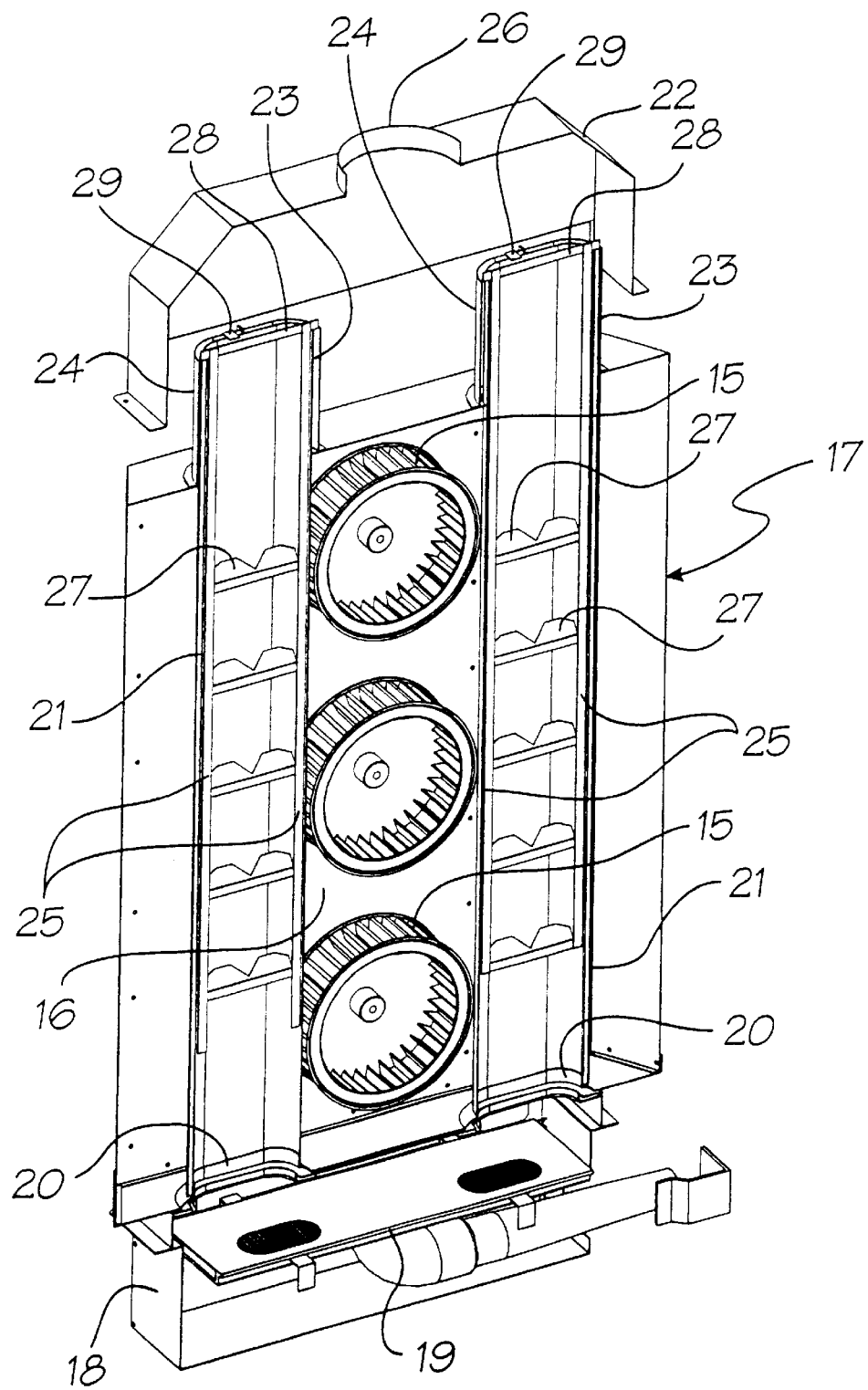
FIG. 4 is a sectional perspective view of the heat exchanger.

With reference to the figures, an oven with forced air circulation, particularly for baking food, according to the present invention, is generally designated by the reference numeral 10.

The oven 10 is constituted, in this case, by a shell 11 that is shaped like a parallelepiped, is thermally insulated, is made of stainless steel plate and can be accessed through a front door 12.

The oven comprises two chambers, a baking chamber 13 and a heat exchange chamber 14, between which air is circulated, in this case by means of three fans 15.

The chambers are divided by a partition 16.

In the heat exchange chamber 14 there is a heat exchanger according to the present invention, generally designated by the reference numeral 17, which comprises a box-like body 18 made of metal plate (preferably stainless steel) which contains burner means, which in this case are constituted by a gas burner 19.

The box-like body 18 is provided, in an upward region, with two short coupling connectors 20 (formed for example by drawing), which have an oval profile and are inserted and preferably interlocked in corresponding complementarily shaped vertical straight tubes 21 that end with an upper manifold 22.

The tubes 21 are arranged in diametrically or side opposite positions of the three fans 15 and in practice have a rectangular cross-section with rounded ends.

The end portion of each one of said tubes 21 is surrounded by an interspace 23, which is formed by a portion of tube 24 that connects said heat exchange chamber 14 to said manifold 22 and protrudes upward from it.

The tubes 21 are therefore mounted so as to interlock in a downward region and are free in an upward region.

The manifold 22 ends with a connector 26 for the coupling of an evacuation tube, not shown, for the evacuation of the products of combustion.

There is no tightness problem in a downward region owing to the difference in pressure that is established between the inside and the exchange chamber 14; accordingly, there is no loss of the products of combustion and therefore there is no contamination of the hot baking air.

In an upward region, the products of combustion cause a Venturi effect on the air contained in the interspace 23, which is drawn into the manifold 22 and then expelled.

In this case, the air of the interspace 23 forms a sort of gasket, which prevents contaminations of the baking air, and such air, which contains the baking vapors and odors, is sent to the outlet.

Two rod-like elements 25 made of metal plate are inserted in each tube 21 from above, and baffles 27 are welded thereon in succession; said baffles are suitable and arranged so as to produce a turbulent motion for the products of combustion in transit and thus improve heat exchange.

The two rod-like elements 25 are welded to an upper end cross-member 28, which straddles the outlet of the respective tube 21.

Transverse elements 29 are also rigidly coupled to the tube portions 24 in order to constitute retention elements against upward axial movements of the tubes 21 that rest with one end thereon.

In practice it has been found that the intended aim and objects of the present invention have been achieved.

A heat exchanger has in fact been provided which has components that are mutually assembled without using welds.

This provides a considerable manufacturing simplification and better resistance to the thermal stresses on the part of the materials during operation, practically eliminating the danger of breakages.

Manufacturing simplification moreover has a positive effect on costs.

It should also be noted that the type of coupling of the tubes 21 on the connectors 20 prevents the water droplets that form on said tubes 21 during steam baking from falling into the box-like body 18 and then onto the burner 19.

The present invention is susceptible of numerous modifications and variations, all of which are within the scope of the appended claims.

The technical details may be replaced with other technically equivalent elements.

The materials, so long as they are compatible with the contingent use, as well as the dimensions, may be any according to requirements.

The disclosures in Italian Patent Application No. PD2001A000259 from which this application claims priority are incorporated herein by reference.

What is claimed is:

1. A heat exchanger for a forced air circulation oven, of a type that comprises two chambers, a baking chamber and a heat exchange chamber between which at least one fan circulates air, the heat exchanger comprising: a box-like body; burner means contained in said body; coupling connectors provided in an upward region of said body and having an oval profile; straight vertical tubes; a manifold; and tube portions that connect said heat exchange chamber to said manifold, said coupling connectors being inserted in corresponding complementarily shaped ends of said straight vertical tubes that have further opposite ends thereof connected to said upper manifold, end portions of each one of said vertical tubes being surrounded by an interspace that is formed by said tube portions.

2. The exchanger of claim 1, wherein said vertical tubes have an oval cross-section and are arranged at side opposite positions of said at least one fan.

3. The exchanger of claim 1, wherein said vertical tubes have a substantially oval cross-section with a rectangular cross-sectional perimetric profile having rounded ends.

4. The exchanger of claim 3, wherein said vertical tubes are mounted in said body by way of an interlocking coupling provided at said complementarily shaped ends thereof with said further opposite ends extending free in an upward region of said body.

5. The exchanger of claim 4, further comprising: two rod-like elements made of metal plate inserted from above inside each one of said vertical tubes; baffles welded to said rod-like elements and arranged so as to produce a turbulent motion for transiting products of combustion; and upper end cross-members, said two rod-like elements being welded to said upper end cross-members that straddle said vertical tubes at outlets thereof.

6. The exchanger of claim 1, further comprising transverse elements rigidly coupled to said tube portions that connect said heat exchange chamber to said manifold, in order to constitute retention elements preventing upward axial movements of said vertical tubes that rest with said further opposite ends on said transverse elements.

* * * * *